(12) United States Patent
Liu et al.

(10) Patent No.: US 11,323,037 B2
(45) Date of Patent: May 3, 2022

(54) FORWARD CONVERTER WITH SECONDARY LCD CONNECTED IN SERIES TO REALIZE EXCITATION ENERGY TRANSFER

(71) Applicant: XI'AN UNIVERSITY OF SCIENCE AND TECHNOLOGY, Xi'an (CN)

(72) Inventors: Shu Lin Liu, Xi'an (CN); Yi Jun Shen, Xi'an (CN); Xue Ting Li, Xi'an (CN); Yin Qiao Peng, Xi'an (CN); Ji Zhi Yan, Xi'an (CN)

(73) Assignee: XI'AN UNIVERSITY OF SCIENCE AND TECHNOLOGY, Xi'an (CN)

( * ) Notice: Subject to any disclaimer, the term of this patent is extended or adjusted under 35 U.S.C. 154(b) by 2 days.

(21) Appl. No.: 17/022,102

(22) Filed: Sep. 16, 2020

(65) Prior Publication Data

US 2021/0376736 A1   Dec. 2, 2021

(30) Foreign Application Priority Data

Jun. 2, 2020   (CN) .......................... 202010490650.4

(51) Int. Cl.
*H02M 3/335*  (2006.01)
*H02M 1/08*   (2006.01)
*H02M 1/00*   (2006.01)

(52) U.S. Cl.
CPC ....... *H02M 3/33553* (2013.01); *H02M 1/083* (2013.01); *H02M 1/0058* (2021.05)

(58) Field of Classification Search
CPC ............. H02M 3/335; H02M 3/33507; H02M 3/33523; H02M 3/33553; H02M 3/33538; H02M 3/33546; H02M 3/337
See application file for complete search history.

(56) References Cited

U.S. PATENT DOCUMENTS 4,785,387 A * 11/1988 Lee .................... H02M 3/3372
                                                                       363/21.03
5,986,899 A * 11/1999 Xia .................... H02M 3/33592
                                                                       363/21.06

(Continued)

FOREIGN PATENT DOCUMENTS

CN       105915060 A  *  8/2016
JP       S-5641769 A  *  4/1981
KR    20190104469 A  *  9/2019 .............. H02M 3/28

*Primary Examiner* — Thienvu V Tran
*Assistant Examiner* — Shahzeb K Ahmad

(57) ABSTRACT

The present disclosure provides a forward converter with secondary LCD connected in series to realize excitation energy transfer, comprising a forward converter main circuit and an energy transfer and transmission circuit. The forward converter main circuit includes a high-frequency transformer T, a switching tube S, a diode D1, a diode D2, an inductance L1, and a capacitor C1. The energy transfer and transmission circuit includes a diode D3, a capacitor C2, and an inductance L2. The circuit structure of the present disclosure has simple circuit structure and high reliability. And the reverse recovery problem of the diode could be eliminated by the soft switch-off or soft switch-on of the switching tube, which further reducing the loss of switching tube and diodes and improving the overall efficiency. In addition, the excitation energy could be transferred to the load side to improve the energy transmission efficiency.

5 Claims, 1 Drawing Sheet

(56) References Cited

U.S. PATENT DOCUMENTS

| | | | | |
|---|---|---|---|---|
| 2014/0062187 A1* | 3/2014 | Shih | ............... | H02M 3/33561 |
| | | | | 307/17 |
| 2016/0043648 A1* | 2/2016 | Usami | ............... | H02M 1/12 |
| | | | | 363/21.12 |

* cited by examiner

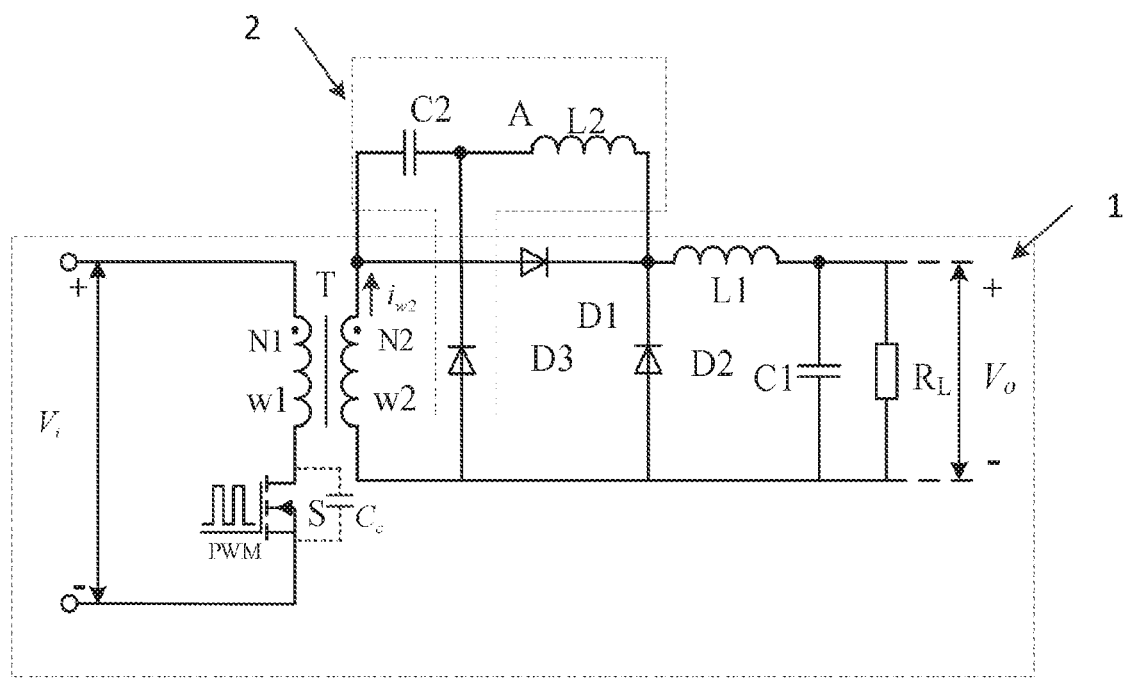

FORWARD CONVERTER WITH SECONDARY LCD CONNECTED IN SERIES TO REALIZE EXCITATION ENERGY TRANSFER

TECHNICAL FIELD

This patent disclosure relates to a field of switching power supplies, in particular to a forward converter with secondary LCD connected in series to realize excitation energy transfer.

BACKGROUND

In the numerous isolated switching power supply conversion topologies, compared with the flyback converter, the power of the forward converter is not limited by the ability of the transformer to store energy; compared with half-bridge and full-bridge converters, the forward converter uses fewer components, has simpler circuits, lower costs, and higher reliability. Therefore, due to its relatively simple structure, low cost, input and output isolation, and high operational reliability, the forward converter circuit is more suitable for application in small and medium-power power conversion occasions, and is highly concerned by the industry.

However, for the single-tube forward converter, because it works in the state of forward excitation, its high-frequency transformer core is unidirectionally magnetized, and itself has no magnetic reset function, which makes it very likely to cause problems such as magnetic core saturation. The result of magnetic saturation will cause the current flowing through the switching tube to increase sharply, or even damage the switching tube, which to a large extent limits the promotion of the forward converter, so, a special magnetic reset circuit or energy transfer circuit must be added to avoid magnetic core saturation.

Therefore, the magnetic reset forward conversion circuit need to be used, the main working mechanism of the magnetic reset circuit is to transfer the excitation energy during the switch off time of each cycle, which could be consumed on other devices or returned to the input power supply or transmitted to the load end.

However, There are many types of magnetic reset circuits used in existing forward converters, which are roughly divided into three types. One is to insert a reset winding at the input end to return energy to the input power; the second is to connect reset circuits such as RCD and LCD on the primary side of the transformer to consume energy or return to the input end; the third is to take reset measures on the secondary side to transfer energy to the output end. But, there are many problems with the magnetic reset circuit used in forward converters, for example, the traditional RCD clamping circuit is relatively simple, and its shortcoming is that the excitation energy is consumed in the clamping resistor, which makes it difficult to improve the overall efficiency of the system; active clamping technology is a good method to achieve magnetic reset, but it increases the complexity, design difficulty and cost of the converter circuit; the reset method of the magnetic reset winding is mature and reliable, and the excitation energy could be returned to the input power supply, but the magnetic reset winding increases the complexity of the transformer structure and the voltage stress of the power switching tube.

Moreover, the existing reset measures on the secondary side either need to increase the reset winding or circuit complexity, which increases the difficulty and cost of the design and manufacturing of the transformer or circuit; or need to use more diodes to realize energy transfer, which increases circuit losses; or it will affect the working mode of forward inductance or other electrical performance indicators, which is not conducive to high power transmission. Therefore, in order to further promoting the application of forward converters, solving the problem of magnetic reset, improving its comprehensive performance, and addressing the shortcomings of other reset methods, researching on new magnetic reset methods is a subject that needs to be continuously discussed.

SUMMARY

An object of the present disclosure is to provide a forward converter with secondary LCD connected in series to realize excitation energy transfer. Then problems can be solved, such as low excitation energy utilization rate, complex circuit composition, large loss, low efficiency, and the problems like the deficiency that the existing secondary side reset that affects the working mode of the forward inductance also can be solved.

The present disclosure provides a forward converter with secondary LCD connected in series to realize excitation energy transfer to solve technical problems of the present disclosure, comprising a forward converter main circuit (1) and an energy transfer and transmission circuit (2) connected to the forward converter main circuit (1); the forward converter main circuit (1) includes a high-frequency transformer T, a switching tube S, a diode D1, a diode D2, an inductance L1, and a capacitor C1; the same-named end of the primary side of the high-frequency transformer T is the positive voltage input end IN+ of the forward converter main circuit (1), which is connected to the positive output end of the external power supply, and the different-named end of the primary side of the high-frequency transformer T is connected to the drain of the switching tube S; the source of the switching tube S is the negative voltage input end IN− of the forward converter main circuit (1), which is connected to the negative output end of the external power supply; the gate of the switching tube S is connected to the output end of the external controller; the same-named end of the secondary side of the high-frequency transformer T is connected to the anode of the diode D1, the cathode of the diode D1 is connected to the cathode of the diode D2 and one end of the inductance L1; the other end of the inductance L1 is connected to one end of the capacitor C1 and is the positive voltage output end OUT+ of forward converter main circuit (1); the different-named end of the secondary side of the high-frequency transformer T is connected to the anode of the diode D2 and the other end of the capacitor C1 and is the negative voltage output end OUT− of the forward converter main circuit (1); the negative voltage output end OUT− of the forward converter main circuit (1) is grounded; the energy transfer and transmission circuit (2) includes a diode D3, a capacitor C2 and an inductance L2; the anode of the diode D3 is connected to the anode of the diode D2, the cathode of the diode D3 is connected to one end of the capacitor C2, the other end of the capacitor C2 is connected to the anode of the diode D1, one end of the inductance L2 is connected to the cathode of the diode D3, the other end of the inductance L2 is connected to the cathode of the diode D1.

In one embodiment, the diodes D1 and D2 are fast recovery diodes.

In one embodiment, the switching tube S is a fully-controlled power semiconductor device.

In one embodiment, the capacitor C2 is selected according to the first selection step; the steps of the first selection step include: step 101, selecting the capacitance $C_2$ of the capacitor C2 of energy storage; step 102, calculating the withstand voltage $V_{C2,max}$ of the capacitor C2 of energy storage; step 103, selecting the capacitor of energy storage with a capacitance $C_2$ and a withstand voltage greater than $V_{C2,max}$; and the inductance L2 is selected according to the second selection step, wherein the steps of the second selection step include: step 201, determining the maximum current of the inductance L2; step 202, determining the value range of the inductance $L_2$ of the inductance L2; step 203, selecting the inductance L2 that meets the inductance and overcurrent capability according to the steps 201 and 202.

In one embodiment, the parameter design and model selection of the diode D3 is selected according to the third selection step; wherein the steps of the third selection step include: step 301, calculating the maximum current $I_{D3,max}$ flowing through the diode D3; step 302, calculating the withstand voltage $V_{D3,max}$ of the diode D3; step 303, selecting the diode according to the maximum current $I_{D3,max}$ flowing through the diode and the withstand voltage $V_{D3,max}$ of the diode.

Compared with the prior art, the present disclosure has the following advantages:

1. the present disclosure is a forward converter with secondary LCD connected in series to realize excitation energy transfer, the excitation energy is transferred to the load side, which improves the utilization rate of transformer excitation energy and improves the overall efficiency of the converter;

2. there is no diode between capacitor C2 and inductance L2, which could reduce the loss of diode during energy exchange between L2 and C2:

3. the switching tube S could be switched off at low voltage or even zero voltage, which reduces the loss of the circuit;

4. the switching tube S could be switched on at low voltage, which reduces the loss of the switching tube;

5. the reverse recovery problem of diodes D1 and D2 could be eliminated, and the reverse surge current of diodes could be suppressed;

6. compared with the existing secondary magnetic reset forward converter, forward converter with secondary LCD connected in series to realize excitation energy transfer could not affect the working mode of the forward inductance and is more suitable for high-power applications.

7. compared with the auxiliary winding reset, the forward converter with secondary LCD connected in series to realize excitation energy transfer simplifies the design and manufacture of transformer and reduces the cost of transformer.

8. the forward converter with secondary LCD connected in series to realize excitation energy transfer has simple circuits, high working stability and reliability, and does not require complicated control schemes, which has wide popularization value.

In summary, the circuit structure of the present disclosure is simple, the implementation is convenient and the cost is low. And, the working mode of the present disclosure is simple, the working stability and reliability are high, the service life is long. Moreover, the power consumption is low, the transformer utilization rate is high, the energy transmission efficiency is high. Furthermore, the working safety and reliability of the power supply of the switch could be improved, and the value of promotion and application is high.

The above and other features, examples and their implementations are described in greater detail in the description, the drawings, and the claims.

BRIEF DESCRIPTION OF DRAWINGS

FIG. 1 is a circuit schematic diagram of the forward converter with secondary LCD connected in series to realize excitation energy transfer of the present disclosure.

In the drawings:

1: forward converter main circuit; 2: energy transfer and transmission circuit.

DETAILED DESCRIPTION

As shown in FIG. 1, in one embodiment, the present disclosure provides a forward converter with secondary LCD connected in series to realize excitation energy transfer, comprising a forward converter main circuit 1 and an energy transfer and transmission circuit 2 connected to the forward converter main circuit 1; the forward converter main circuit 1 includes a high-frequency transformer T, a switching tube S, a diode D1, a diode D2, an inductance L1, and a capacitor C1; the same-named end of the primary side of the high-frequency transformer T is the positive voltage input end IN+ of the forward converter main circuit 1, which is connected to the positive output end of the external power supply, and the different-named end of the primary side of the high-frequency transformer T is connected to the drain of the switching tube S; the source of the switching tube S is the negative voltage input end IN− of the forward converter main circuit 1, which is connected to the negative output end of the external power supply; the gate of the switching tube S is connected to the output end of the external controller; the same-named end of the secondary side of the high-frequency transformer T is connected to the anode of the diode D1, the cathode of the diode D1 is connected to the cathode of the diode D2 and one end of the inductance L1; the other end of the inductance L1 is connected to one end of the capacitor C1 and is the positive voltage output end OUT+ of forward converter main circuit 1; the different-named end of the secondary side of the high-frequency transformer T is connected to the anode of the diode D2 and the other end of the capacitor C1 and is the negative voltage output end OUT− of the forward converter main circuit 1; the negative voltage output end OUT− of the forward converter main circuit 1 is grounded; the energy transfer and transmission circuit 2 includes a diode D3, a capacitor C2 and an inductance L2; the anode of the diode D3 is connected to the anode of the diode D2, the cathode of the diode D3 is connected to one end of the capacitor C2, the other end of the capacitor C2 is connected to the anode of the diode D1, one end of the inductance L2 is connected to the cathode of the diode D3, the other end of the inductance L2 is connected to the cathode of the diode D1.

specifically, the load RL is connected between the positive voltage output end OUT+ and the negative voltage output end OUT− of the forward converter main circuit 1. In the forward converter main circuit 1, both the inductance L1 and the capacitor C1 are used for filtering.

In one embodiment, the diode D1 is a rectifier diode, and the diode D2 is a fast recovery diode. The diode D2 is used for freewheeling.

In one embodiment, the switching tube S is an NMOS switching tube.

The working principle of this embodiment is:

Before analyzing the working principle of this embodiment, it is assumed that the forward inductance L1 and the auxiliary inductance L2 work in CCM, the transformer secondary inductance Lw2 work in DCM. The working principle of this embodiment is analyzed in the present disclosure, which is divided into the off period and the on period of the switching tube.

In order to facilitate the introduction of the principle, the convention is as follows:

for C2, the voltage is assumed to be a forward voltage when the left voltage of C2 is negative and the right voltage of C2 is positive, the voltage is assumed to be a reverse voltage when the left voltage of C2 is positive and the right voltage of C2 is negative; for the secondary winding w2, the current is assumed to be a forward current when the current of w2 is from bottom to top, the current is assumed to be a reverse current when the current of w2 is from top to bottom.

1. The energy transmission process and working principle during the off period of the switching tube S It is assumed that before the switching tube is switched off, the forward current of w2 and the current of L1 are risen to the maximum. D1 is switched on, while D2, D3 are switched off.

Stage 1: the switching tube is switched off at low voltage

After the driving signal of the switching tube changes from high level to low level, the switching tube is entered into the off period. In the process of the switching tube passing from the conduction to the shutdown, the parasitic capacitance Cc of the switching tube is charged by the excitation current and secondary reflected current, the voltage across the switching tube is increased, the primary voltage and secondary voltage of the transformer is decreased. Once the secondary voltage is decreased to be equal to the reverse voltage of C2, this stage is over.

At this stage, the voltage borne by the switching tube is Vi-nVC2 (Vi is input voltage, VC2 is the maximum reverse voltage of C2, n is the transformer ratio), so the voltage borne by the switching tube is much smaller than Vi, and the switching tube is switched off at low voltage (under certain parameters, zero voltage shutdown can also be achieved).

At this stage, D1 is kept on, while D2 and D3 are switched off, and C2 is charged in reverse by L2.

Stage 2: the reverse energy storage of capacitor C2 is released and the energy of L2 is released After the secondary voltage is decreased to be equal to the reverse voltage of C2, D3 is switched on (at zero voltage and zero current), and the reverse energy storage of capacitor C2 begins to be released through two loops: one is that the reverse energy storage of C2 is released through D1, L1, RL, and D3; the other is that the reverse energy storage of C2 is released through w2 and D3, causing the forward current of the secondary winding of the transformer to be decreased. In addition, the energy of L2 is released to the load through L1, RL, and D3, and the energy of L2 is dropped to zero at this stage. With the discharge of C2, the reverse voltage of C2 continues to be decreased. Once the reverse voltage of C2 is dropped to zero, the primary voltage and secondary voltage of the transformer are also dropped to zero (the voltage across the switching tube is risen to Vi), and D3 is still kept on, the reverse energy storage of C2 is released completely, and this stage is over.

At this stage, when the secondary voltage is dropped to near zero, the current flowing through the secondary windings w2 and D1 slowly is decreased until it is zero, and D1 is completely switched off; while the current of D2 is slowly increased until it is equal to the current flowing through L1. D2 is completely switched on.

At the end of this stage, D1 is naturally switched off, and D2 is naturally switched on. Therefore, D2 is switched on at zero voltage and zero current, and D1 is switched off at zero voltage and zero current.

Stage 3: the forward energy of capacitor C2 is stored, the excitation inductance of transformer is reset This stage begins, after the reverse voltage of the capacitor C2 being dropped to zero. After that, D3 is kept on, the primary winding of the transformer is coupled to the secondary winding, the capacitor C2 is charged forward by the current of secondary winding. The forward voltage of the capacitor C2 is increased from zero, while the current of secondary winding begins to be decreased from the maximum. Until the current of secondary winding is decreased to zero, the forward voltage of C2 is reached the maximum, and the magnetic reset of the transformer is completed, this stage is over.

At this stage, the current of inductance L2 is remained at zero.

At the end of this stage, D3 is switched off at zero current and zero voltage.

Stage 4: the forward storage is released from the capacitor C2 to L2 and w2

This stage begins, after the forward voltage of the capacitor C2 being risen to the maximum. After that, since D3 is switched off, D2 is kept on, therefore, the loop of C2, L2, and w2 is short-circuited, and energy is transferred from the capacitor C2 to L2 and w2. The current resonance of secondary w2 and the inductance L2 is increased, and the current of the inductance L1 is decreased, until the current of the inductance L2 is risen to be equal to the current of the inductance L1, the current flowing through the diode D2 is zero, shutdown at zero current of D2 is achieved, and this stage is over.

Stage 5: the energy of the capacitor C2 is transferred to the load

This stage begins, after the current of the inductance L2 being risen to the maximum. After that, the energy is released from C2 and L2 to L2, L1, RL, until the forward voltage of C2 is dropped to zero, this stage is over.

At this stage, D1, D2, and D3 is kept off.

Stage 6: the energy is transferred from w2 and L1 to the load (preconditions for the switching tube to be switched on at low-voltage)

After the forward voltage of C2 being dropped to zero, D1 is switched on naturally. After that, a freewheeling loop is formed by w2, D1, L1 and RL, and the current of the w2 and L1 is dropped linearly, energy is provided to the load by the freewheeling loop that creates conditions for the switching tube to be switched on at low-voltage. At this stage, since D1 is switched on, L2 and C2 are short-circuited, C2 is charged in reverse by L2 until the switching tube is switched on, and this stage is over.

At this stage, D1 is switched on at zero voltage and zero current

2. The energy transmission process and working principle during the on period of the switching tube S Stage 1: the switching tube is switched on at low voltage Before the switching tube being switched on, a circulation circuit is formed by w2, D1, L1, and RL, the voltage at the top of secondary winding w2 of the transformer is positive and the voltage at the bottom of the secondary winding w2 of the transformer is negative. Actually, the output voltage is divided by the series connection of w2 and L1, but since the inductance of w2 is much greater than the inductance of L1, the partial voltage Vw2 of w2 is higher. Therefore, the voltage across the switching tube is Vi-nVw2 (Vi is input voltage, Vw2 is the voltage across the secondary winding w2 of the transformer, n is the transformer ratio).

Obviously, the voltage borne by the switching tube is much smaller than Vi. If the switching tube is switched on at this time, then the switching tube is switched on at low voltage.

Stage 2: positive excitation energy is transmitted, energy of L2 is transferred to C2

After the switching tube being switched on, the voltage across the primary winding of the transformer is the input voltage Vi. The input voltage is coupled to the secondary winding by the primary winding of the transformer according to the turns ratio. The voltage at the top of primary winding is positive and the voltage at the bottom of primary winding is negative, D1 is kept on, forward excitation energy is transferred to the load through the inductance L1, and the current of L1 is risen linearly. As D1 is kept on in the process, the series branches of C2 and L2 are short-circuited, C2 is charged in reverse by inductance L2 until the next switch off cycle comes, this stage is over, but the current of L2 is not dropped to zero.

In this embodiment, the capacitor C2 is selected according to the first selection step; the steps of the first selection step include:

step 101, selecting the capacitance $C_2$ of the capacitor C2 of energy storage according to the formula:

$$C_2 \leq \frac{4(1-d)^2 n^2}{L_m \cdot \pi^2 f^2};$$

step 102, calculating the withstand voltage $V_{C2,max}$ of the capacitor C2 of energy storage according to the formula:

$$V_{C2,max} = \frac{V_i dT}{\sqrt{C_2 L_m}};$$

In the formula above, the d is the duty ratio of the switching tube S, the n is the turns ratio of the primary winding and the secondary winding of the high-frequency transformer T, $L_m$ is the excitation inductance of the primary winding of the high-frequency transformer T, f is the operating frequency of the forward converter main circuit 1, $V_i$ is the input voltage of the forward converter main circuit 1.

step 103, selecting the capacitor of energy storage with a capacitance $C_2$ and a withstand voltage greater than $V_{C2,max}$.

In this embodiment, the inductance L2 is selected according to the second selection step; wherein the steps of the second selection step include:

step 201, determining the maximum current $I_{L2,max}$ of the inductance L2 according to the formula:

$$I_{L2,max} = \frac{V_i dT}{\sqrt{L_m L_2}};$$

step 202, determining the value range of the inductance $L_2$ of the inductance L2 according to the following formula:

$$\frac{d^2}{\pi^2 f^2 C_2} \leq L_2 \leq \frac{(d-1)^2 n^2 - \pi^2 f^2 L_M C_2}{n^2 \pi^2 f^2 C_2}$$

step 203, selecting the inductance that satisfying the inductance and overcurrent capability according to the steps 201 and 202.

In this embodiment, the parameter design and model selection of the diode D3 is selected according to the third selection step; the steps of the third selection step include:

step 301, calculating the maximum current $I_{D3,max}$ flowing through the diode D3 according to the following formula:

$$I_{D3,max} = I_{Lm,max} + I_{L1,max} + I_{L2,off}$$
$$= \frac{V_i}{L_m} dT + \frac{V_i - nV_O}{nL_1} dT + \frac{V_i dT}{\sqrt{L_m L_2}} \cdot \sin\left(\frac{dT}{\sqrt{L_2 C_2}}\right)$$

step 302, calculating the withstand voltage $V_{D3,max}$ of the diode D3 according to the following formula:

$$V_{D3,max} = \frac{V_i dT}{\sqrt{C_2 L_m}} + \frac{V_i}{n}$$

In the formula above, $V_o$ is the output voltage of the forward converter main circuit 1, $I_{L1,max}$ is the maximum current flowing through the primary winding of the high-frequency transformer T, $I_{L2}$ is the current flowing through the inductance L2;

step 303, selecting the diode according to the maximum current $I_{D3,max}$ flowing through the diode and the withstand voltage $V_{D3,max}$ of the diode;

It should be understood that the above description is merely to illustrate the feasibility of the technical solution of the present disclosure, and the principles and corresponding formulas of one of the listed working modes are not the only and limited descriptions, and are only used for reference.

It should be particularly noted that the above embodiments are only used to illustrate the technical solutions of the present disclosure, not to limit them. For those skilled in the art, the technical solutions described in the above embodiments may be modified, or some of the technologies features are equivalently replaced; and all these modifications and replacements should fall within the scope of protection of the appended claims of the present disclosure.

What is claimed is:

1. A forward converter with a secondary LCD connected in series to realize excitation energy transfer, comprising:
a forward converter main circuit (1); and
an energy transfer and transmission circuit (2) connected to the forward converter main circuit (1);
wherein, the forward converter main circuit (1) comprises:
a high-frequency transformer T;
a switching tube S;
a first diode D1;
a second diode D2;
a first inductance L1; and
a first capacitor C1; and
wherein, a first end of a primary winding of the high-frequency transformer T is a positive voltage input end IN+ of the forward converter main circuit (1), which is connected to a positive output end of the external power supply, and the a second end of a primary winding of the high-frequency transformer T is connected to a drain of the switching tube S; a source of the switching tube S is a negative voltage input end IN− of the forward converter main circuit (1), which is connected to the a negative output end of the external power supply; a gate of the switching tube S is connected to an output end of the external controller; a first end of a secondary winding of the high-frequency transformer T is connected to the anode of the first diode D1, the cathode of the first diode D1 is connected to the cathode of the second diode D2 and one end of the first inductance L1; the other end of the first inductance L1 is connected to one end of the first capacitor C1 and a positive voltage output end OUT+ of forward converter main circuit (1); a second end of a secondary winding of the high-frequency transformer T is connected to the anode of the second diode D2 and the other end of the first capacitor C1 and is a negative voltage output end OUT− of the forward converter main circuit (1); the negative voltage output end OUT− of the forward converter main circuit (1) is grounded;

wherein, the energy transfer and transmission circuit (2) comprises:
a third diode D3;
a second capacitor C2; and
second inductance L2; and
wherein, the anode of the third diode D3 is connected to the anode of the second diode D2, the cathode of the third diode D3 is connected to one end of the second capacitor C2, the other end of the second capacitor C2 is connected to the anode of the first diode D1, one end of the second inductance L2 is connected to the cathode of the third diode D3, the other end of the second inductance L2 is connected to the cathode of the first diode D1.

2. The forward converter with the secondary LCD connected in series to realize excitation energy transfer as in claim 1, wherein the first diode D1 and the second diode D2 are fast recovery diodes.

3. The forward converter with the secondary LCD connected in series to realize excitation energy transfer as in claim 1, wherein the switching tube S is a fully-controlled power semiconductor device.

4. The forward converter with the secondary LCD connected in series to realize excitation energy transfer as in claim 1, wherein the second capacitor C2 is selected according to a first selection step; wherein the steps of the first selection step comprise:
step 101, selecting the capacitance $C_2$ of the second capacitor C2 for energy storage;
step 102, calculating a first withstand voltage $V_{C2,max}$ of the second capacitor C2 for energy storage;
step 103, selecting the capacitor for energy storage with the capacitance $C_2$ and a withstand voltage greater than $V_{C2,max}$; and
wherein the second inductance L2 is selected according to a second selection step; wherein the steps of the second selection step comprise:
step 201, determining the maximum current of the second inductance L2;
step 202, determining the value range of the inductance $L_2$ of the second inductance L2;
step 203, selecting the second inductance L2 that meets the inductance and overcurrent capability according to the steps 201 and 202.

5. The forward converter with the secondary LCD connected in series to realize excitation energy transfer as in claim 4, wherein the parameter design and model selection of the third diode D3 is selected according to a third selection step; wherein the steps of the third selection step comprise:
step 301, calculating a maximum current $I_{D3,max}$ flowing through the third diode D3;
step 302, calculating a second withstand voltage $V_{D3,max}$ of the third diode D3;
step 303, selecting the third diode D3 according to the maximum current $I_{D3,max}$ flowing through the third diode D3 and the second withstand voltage $V_{D3,max}$ of the third diode D3.

* * * * *